US006940837B1

(12) United States Patent
Kotake (10) Patent No.: US 6,940,837 B1
(45) Date of Patent: Sep. 6, 2005

(54) SPREAD SPECTRUM DEMODULATOR (75) Inventor: Takamasa Kotake, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1129 days.

(21) Appl. No.: 09/585,571

(22) Filed: Jun. 2, 2000

(30) Foreign Application Priority Data

Feb. 10, 2000 (JP) ............................. 2000-033788

(51) Int. Cl.$^7$ ........................................... H04B 7/216
(52) U.S. Cl. ..................................... 370/335; 375/142
(58) Field of Search ................................ 370/335, 342, 370/441, 320; 375/145, 142, 147, 149, 150, 375/144, 148

(56) References Cited

U.S. PATENT DOCUMENTS

| 5,151,920 A | * | 9/1992 | Haagh et al. ............... 375/150 |
| 5,291,517 A | * | 3/1994 | Stein et al. ................. 375/142 |
| 5,353,301 A | | 10/1994 | Mitzlaff |
| 5,745,531 A | * | 4/1998 | Sawahashi et al. ......... 375/345 |

FOREIGN PATENT DOCUMENTS

| EP | 0 177 963 A2 | 4/1986 |
| EP | 0 877 493 A2 | 11/1998 |
| GB | 2 343 817 A | 5/2000 |
| GB | 2 346 780 A | 8/2000 |
| JP | 7202750 | 8/1995 |
| JP | HEI 09-162940 A | 6/1997 |
| JP | HEI 10-13302 A | 1/1998 |
| JP | 1051424 | 2/1998 |
| JP | HEI 10-065573 A | 3/1998 |
| JP | 10173630 | 6/1998 |
| JP | 2000-40981 A | 2/2000 |
| WO | WO 98/29960 A2 | 7/1998 |

* cited by examiner

Primary Examiner—Chi Pham
Assistant Examiner—Alexander O. Boakye
(74) Attorney, Agent, or Firm—Rothwell, Figg, Ernst & Manbeck (57) ABSTRACT

A spread spectrum demodulator which is capable of correctly and simultaneously demodulating reception waves that were spread by using the same spreading signal and transmitted from a plurality of transmitters. A plurality of reception waves that are spread by using the same spreading signal and transmitted from a plurality of transmitters can correctly be demodulated simultaneously by establishing initial synchronization for each of the reception waves and then tracing reception timing of each reception wave individually. A plurality of tracing circuits for tracing a plurality of reception waves, respectively, are provided and each of the tracing circuits can communicate the timing of the reception wave being traced by itself to a masking circuit to prevent the other tracing circuits from operating with the same timing. The masking circuit can invalidate timing detected by an amplitude judgment circuit if it precedes or succeeds already detected timing by, for example, a 0.5 chip timing or less. This makes it possible to prevent an already detected transmission wave from being detected again.

13 Claims, 6 Drawing Sheets

SPREAD SPECTRUM DEMODULATOR

BACKGROUND OF THE INVENTION

1. Field of the Invention

The present invention relates to a spread spectrum demodulator according to the direct sequence code division multiple access (DS-CDMA) scheme.

2. Description of Related Art

A DS-CDMA system consists of a spread spectrum modulator which spreads the bandwidth of a data signal by multiplying each of its symbols by a spreading code as a pseudo noise signal and transmits a resulting signal, and a spread spectrum demodulator which demodulates a reception signal through de-spreading in which the reception signal is multiplied by the same spreading code as used in the transmission side. In this DS-CDMA system, when a reception signal is de-spread in the spread spectrum demodulator, not only noise that was added on a transmission channel but also a transmission signal produced by using a different spreading code is de-spread. Therefore, a demodulated reception signal is scarcely influenced by such noise or a transmission signal. In general, a DC-CDMA system realizes multiplexing in the same frequency band by using different spreading codes for respective sets of a modulator and a demodulator that communicate with each other. However, even where the same spreading code is used for plural sets of a modulator and a demodulator, multiplexing is still possible because a transmission signal of a set other than the set concerned is spread if the symbol timing is not completely identical among the plural sets of a modulator and a demodulator.

Figure 6:
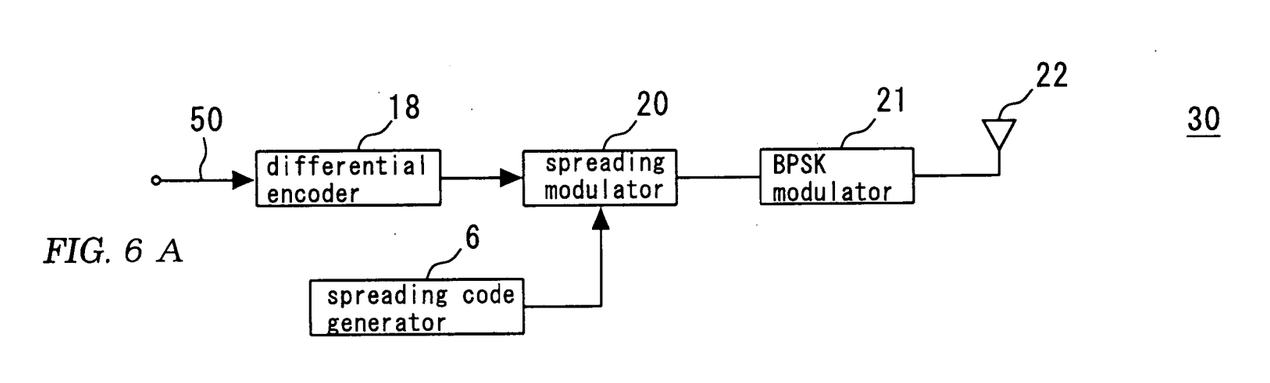
FIG. 6A shows an example of a conventional spread spectrum modulation circuit 30 that is used in a DC-CDMA system.
FIG. 6B shows an example of a conventional spread spectrum demodulation circuit 31 that is used in a DC-CDMA system.

FIG. 6A shows an example of a conventional spread spectrum modulation circuit 30 that is used in a DC-CDMA system, and FIG. 6B shows an example of a conventional spread spectrum demodulation circuit 31 that is used in a DC-CDMA system. In FIG. 6A, reference numeral 18 denotes a differential encoder for performing differential coding on transmission data 50; 6, a spreading code generator for generating a spreading code; 20, a spreading modulator for multiplying the transmission data that has been subjected to differential coding in the differential encoder 18 by the spreading code that has been generated by the spreading code generator 6; 21, a BPSK modulator for performing binary phase shift keying (BPSK) on the transmission data that has been spread by the spreading modulator 20; and 22, a transmission antenna for transmitting the transmission data that has been amplified.

In FIG. 6B, reference numeral 2 denotes a reception antenna for receiving data and numeral 3 denotes a BPSK demodulator for BPSK-demodulating the reception data. Reference symbols 4a and 4b denote A/D converters for converting demodulated orthogonal I-component data (I) and Q-component data (Q) into digital data. Reference symbols 5a and 5b denote correlators for demodulating, by de-spreading, the orthogonal digital I-component data (I) and Q-component data (Q) by multiplying those data by respective spreading codes generated by a spreading code generator 6 that are the same as used in the transmission side. Reference numeral 7 denotes a polar coordinates converter POLAR for polar-coordinates-converting the de-spread I-component data (I) and Q-component data (Q). Reference numeral 19 denotes an amplitude judgment device for performing cyclic addition and threshold judgment on amplitude-component data (r) that has been produced by the polar coordinates conversion. The amplitude judgment device 19 performs initial synchronization in which timing having the maximum correlation value among pieces of one-symbol timing is detected. Successively, reference numeral 9 denotes a Δf corrector for latching, with the timing that has been synchronization-confirmed by the amplitude judgment device 19, frequency-component data (φ) that has been produced by the polar coordinates conversion, and correcting for an offset of a carrier frequency of the spread spectrum modulator and demodulator. Reference numeral 10 denotes a delay detector for detecting the data that has been corrected by the Δf corrector 9.

The conventional spread spectrum demodulator 31 of FIG. 6B that is used in a DS-CDMA system can only cope with a case where one reception wave exists in a one-symbol timing. For example, if transmission waves that were spread by using the same spreading signal as used in the receiver side are transmitted from two transmitters simultaneously, two pieces of timing having almost the same correlation values that are larger than a threshold value are detected in a one-symbol timing. The receiver side judges that timing that happens to have the maximum value is reception timing. Therefore, which timing is acquired is indefinite, that is, depends on the correlation values that vary due to noise etc., resulting in a problem that a normal receiving operation cannot be performed.

Even if plural pieces of correct timing were detected (initial synchronization), the detection timing in the one-symbol timing that is predetermined by an operation clock signal of the receiver would gradually deviate due to errors between operation clock signals of the transmitter and receiver. Where synchronization is made with the same timing in each symbol timing, there arises a problem that errors occur in reception data.

SUMMARY OF THE INVENTION

The present invention has been made to solve the above problems in the art, and an object of the invention is therefore to provide a spread spectrum demodulator capable of correctly and simultaneously demodulating reception waves that were spread by using the same spreading signal and transmitted from a plurality of transmitters.

According to an aspect of the present invention, there is provided a spread spectrum demodulator for demodulating a plurality of received spread spectrum signals, comprising: a timing detector for receiving amplitude components of the plurality of received spread spectrum signals, the amplitude components being produced by de-spreading and then polar-coordinates-converting the spread spectrum signals, establishing initial synchronization individually for the spread spectrum signals by detecting maximum values of the amplitude components, and outputting individually traced pieces of reception timing of the spread spectrum signals; and a plurality of correctors for latching, with the pieces of reception timing that are outputted from the timing detector, a plurality of frequency components of the respective spread spectrum signals, the frequency components being produced by de-spreading and then polar-coordinates-converting the spread spectrum signals, and correcting for an offset, and outputting resulting signals.

The above and other objects, effects, features and advantages of the present invention will become more apparent from the following description of the embodiments thereof taken in conjunction with the accompanying drawings.

BRIEF DESCRIPTION OF THE DRAWINGS

FIGS. 3A–3D3 are a timing chart of the timing detector 8 according to the embodiment 2.

FIGS. 5A–5E are timing charts of the tracing circuit according to the embodiment 3.

DETAILED DESCRIPTION OF THE PREFERRED EMBODIMENTS

Embodiments of the present invention will be described below with reference to the accompanying drawings. It is noted that the same reference symbols in the drawings denote the same or corresponding components.

Embodiment 1

Figure 1:
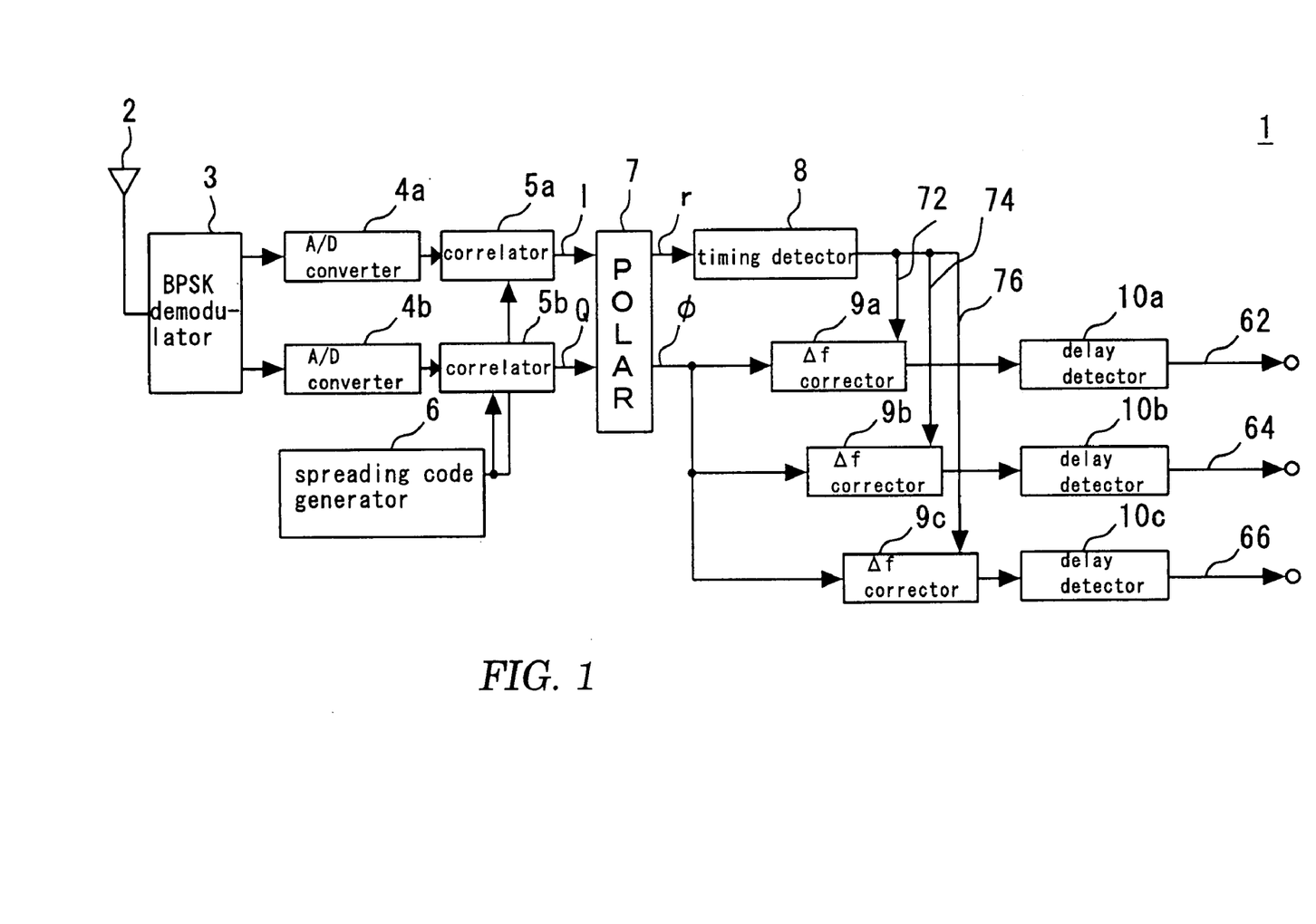
FIG. 1 shows a spread spectrum demodulator 1 according to a embodiment 1 of the invention.

FIG. 1 shows a spread spectrum demodulator 1 according to a embodiment 1 of the invention. In FIG. 1, reference numeral 1 denotes a spread spectrum demodulator in the embodiment 1 of the invention, reference numeral 2 denotes a reception antenna for receiving a plurality of data (transmission waves, spread spectrum signals) and numeral 3 denotes a BPSK demodulator for BPSK-demodulating the plurality of the reception data (transmission waves) and for outputting an orthogonal I-component data and Q-component data. Reference symbols 4a and 4b denote A/D converters for converting the demodulated orthogonal I-component data and Q-component data into digital data. Reference symbols 5a and 5b denote correlators for demodulating, by de-spreading, the orthogonal digital I-component data and Q-component data by multiplying those by respective spreading codes generated by a spreading code generator 6 that are the same as used in the transmission side. Reference numeral 7 denotes a polar coordinates converter POLAR for polar-coordinates-converting the de-spread I-component data (I)/Q-component data (Q). Reference numeral 8 denotes a timing detector for establishing initial synchronization, for each of a plurality of transmission waves, for amplitude-component data (r) that has been produced by the polar coordinates conversion, individually tracing pieces of reception timing a (72), b (74), and c (76), and outputting those pieces of timing. Reference symbols 9a, 9b, and 9c denote Δf correctors for latching, with the pieces of timing that have been synchronization-confirmed by the timing detector 8, frequency-component data (φ) that has been produced by the polar coordinates conversion, and correcting for an offset of a carrier frequency of the spread spectrum modulator and demodulator. Reference symbols 10a, 10b, and 10c denote delay detectors for detecting data that have been corrected by the Δf correctors 9a, 9b, and 9c or outputting reception data a (62), b (64), or c (66), respectively.

As shown in FIG. 1, the spread spectrum demodulator 1 according to the embodiment 1 is configured in such a manner that the amplitude judgment circuit 19 of the conventional spread spectrum demodulator shown in FIG. 6B is replaced by the timing detector 8. The timing detector 8 receives amplitude-component data (r) of a plurality of spread spectrum signals that have been de-spread by the correlator 5a and then polar-coordinates-converted by the polar coordinates converter 7. The timing detector 8 establishes initial synchronization individually for a plurality of spread spectrum signals by detecting the maximum values of the received amplitude-component data (r), and outputs individually traced pieces of reception timing a (72), b (74), and c (76) to the Δf correctors 9a, 9b, and 9c, respectively. The Δf correctors 9a, 9b, and 9c latch, at the pieces of timing that are output from the timing generator 8, frequency-component data (φ) of the spread spectrum signals that have been de-spread by the correlators 5a and 5b and then polar-coordinates-converted by the polar coordinates converter 7, correct for an offset, and output resulting data. The Δf correctors 9a, 9b, and 9c and the delay detectors 10a, 10b, and 10c, which are provided downstream of the timing detector 8, are provided in the number of transmission waves to be received simultaneously. Since the three Δf correctors 9a-9c and the three delay detectors 10a–10c are provided, the spread spectrum demodulator 1 of FIG. 1 can receive three transmission waves simultaneously. However, the number "3" is employed here for convenience of description and the number of transmission waves to be received simultaneously is not limited to three.

As described above, according to the embodiment 1, pieces of reception timing can be traced individually after initial synchronization was established individually for a plurality of reception waves. Therefore, reception waves that were spread by using the same spreading signal and then transmitted from a plurality of transmitters can correctly be detected simultaneously.

Embodiment 2

Figure 2:
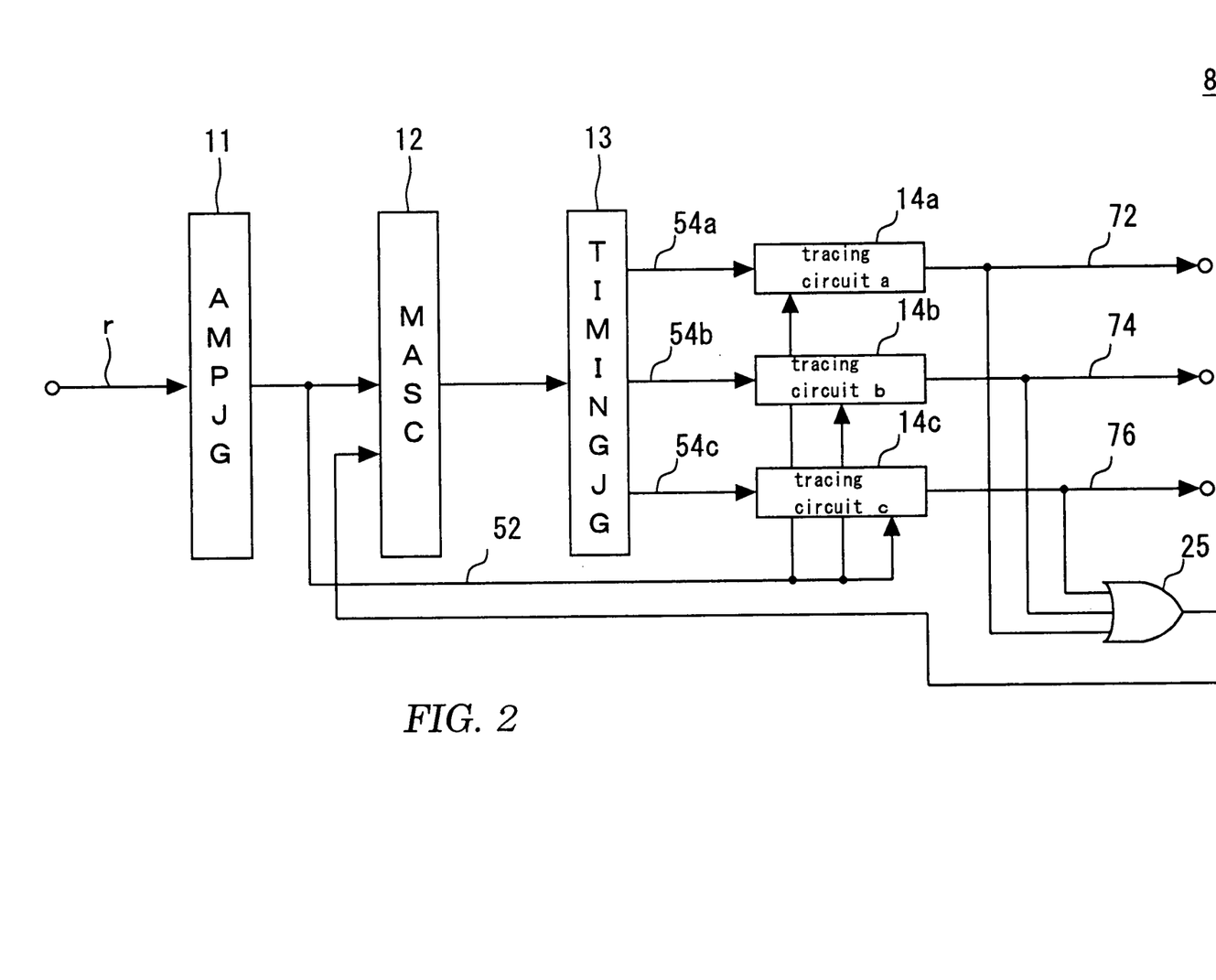
FIG. 2 shows a timing detector according to a embodiment 2 of the invention, which is an example of the timing detector 8 shown in FIG. 1.

FIG. 2 shows a timing detector according to a embodiment 2 of the invention, which is an example of the timing detector 8 shown in FIG. 1. The components in FIG. 2 that are given the same reference symbols as the corresponding components in FIG. 1 have the same functions as the latter and hence will not be described. In FIG. 2, reference numeral 11 denotes an amplitude judgment circuit AMPJG (amplitude judgment section) for detecting timing by performing a threshold judgment on amplitude component data (r) that has been polar-coordinates-converted by the polar coordinates converter 7. Reference numeral 12 denotes a masking circuit MASC (masking section) for outputting only so far undetected timing by performing such masking as to delete timing that has been detected by the amplitude detection circuit 11 if it is the same as already detected timing and it precedes or succeeds the already detected timing by an x chip timing or less. The optimum value of the x chip timing varies with the sampling rate of the A/D converter 4a. Successively, reference numeral 13 denotes a timing judgment circuit TIMINGJG (timing judgment section) for receiving so far undetected pieces of timing and outputting those to unused tracing circuits 14a etc. (described later) as pieces of initial synchronization timing a (54a) etc. Reference symbols 14a, 14b, and 14c denote tracing circuits (tracing sections) which, when receiving respective pieces of initial synchronization timing a (54a), b (54b), or c (54c) from the timing judgment circuit 13, stores the pieces of initial synchronization timing a (54a) etc. and thereafter performs timing tracing until the transmission waves corresponding to the stored pieces of timing cease. Reference numeral 25 denotes a logical OR circuit (masking condition section) for outputting together, to the masking circuit 12, the pieces of timing that are being traced by the tracing circuits a (14a) etc. The pieces of reception timing a (72), b (74), or c (76) that are output from the tracing circuit-a (14a), -b (14b), or -c (14c) are supplied to the Δf correctors 9a, 9b, or 9c, respectively.

Figure 3A:
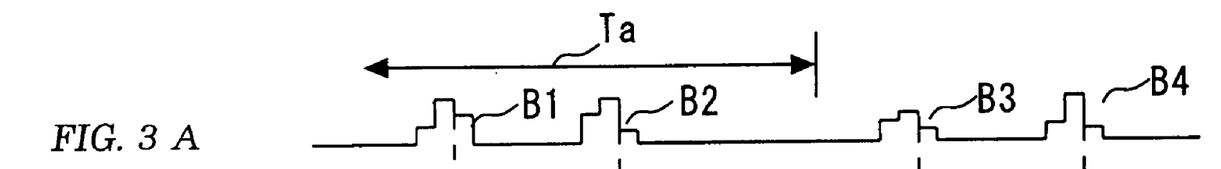

FIGS. 3A–3D3 are a timing chart of the timing detector 8 according to the embodiment 2. More specifically, FIG. 3 shows a case where a second signal wave is received when the tracing circuit-a (14a) is being used after reception of a first transmission wave. In FIGS. 3A–3D3, Ta represents a one-symbol timing during which to detect correlation values that are larger than a threshold value and Ts represents one sampling timing. A condition that allows tracing of timing movement is that the timing movement amount between adjacent symbol timings Ta is one sampling timing Ts or less, that is, the interval between two pieces of timing is in a range of Ta±Ts. FIGS. 3A–3D3 show a case where the sampling clock rate of the A/D conversion in the A/D converter 4a that is located upstream of the timing detector 8 is two times the chip rate. In the case of this two-fold oversampling, in the amplitude judgment circuit 11 a threshold value is so set that, for each transmission wave, amplitude values are detected consecutively over a 1.5 chip timing at the maximum, that is, a maximum of three pieces of timing are detected consecutively. An output of the amplitude judgment circuit 11 is blocks B1 etc. each having a width of three or less pieces of timing (for one transmission wave). Timing having the maximum amplitude in each of the blocks B1-is considered true timing of the corresponding transmission wave.

Figure 3B:
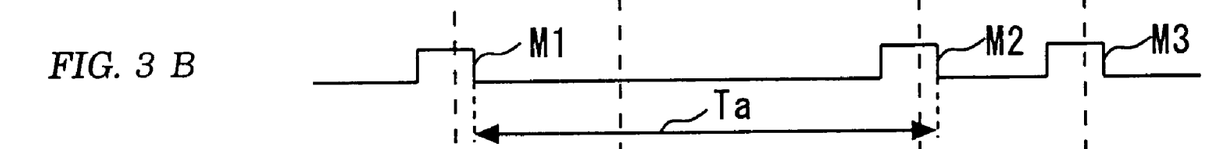
Figure 3C:
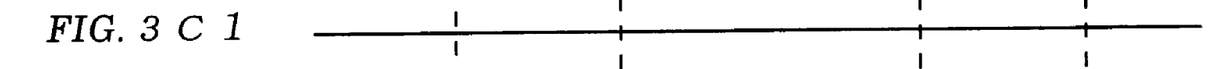
Figure 3C:
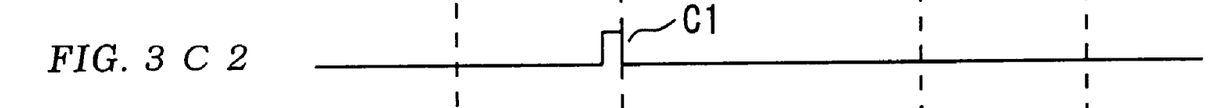
Figure 3C:
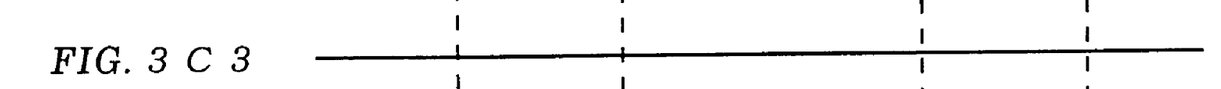
Figure 3D:
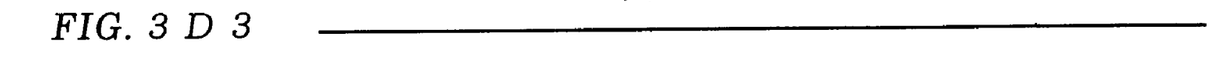

FIG. 3A shows an output of the amplitude judgment circuit 11. Symbols B1 denotes one block (mentioned above) having a width of three or less pieces of timing and corresponding to the first transmission wave, and B2 denotes one block corresponding to the second transmission wave. FIG. 3B indicates masking conditions for the masking circuit 12 (an output of the OR circuit 25). A masking condition M1 is one corresponding to the tracing circuit-a (14a) that is already used. FIGS. 3C1–3C3 show outputs 54a–54c of the timing judgment circuit 13, respectively. No output pulse is shown in FIG. 3C1 because the timing judgment circuit 13 has already output initial synchronization timing a (54a) to the tracing circuit-a (14a). An output (output pulse) Cl indicates initial synchronization timing b (54b) that is supplied to the tracing circuit-b (14b) for the second transmission wave that has just been received. FIG. 3C3 shows an output corresponding to a so far non-received third transmission wave. No output pulse is shown in FIG. 3C3 because a third transmission wave has not been received yet. FIGS. 3D1, 3D2, and 3D3 show outputs 72, 74, or 76 of the tracing circuits 14a, 14b, and 14c, respectively. An output (output pulse) Ta1 in FIG. 3D1 indicates reception timing 72 for the already received first transmission wave that is output from the tracing circuit-a (14a).

Figures 3D, 3D:
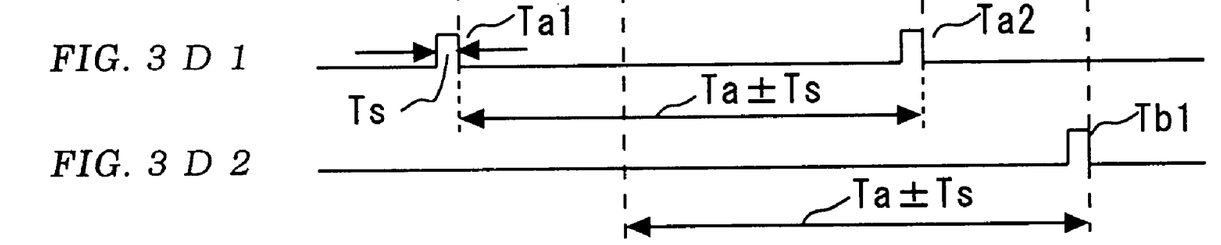

Based on the output 72 (output pulse Ta2) of the tracing circuit-a (14a) shown in FIG. 3D1, the timing of the first transmission wave is communicated to the masking circuit 12 to prevent the other tracing circuits (i.e., the tracing circuit-b (14b) etc.) from operating with the same timing (masking condition M2). The interval between the masking conditions M1 and M2 is one symbol timing Ta. As a result, a block B3 that is output from the amplitude judgment circuit 11 is subjected, as it is, to timing tracing by the tracing circuit-a (14a). As described above, timing movement of one sampling timing Ts or less (the interval between pieces of timing is in a range of Ta±Ts) can be traced. Similarly, based on the output 74 (output pulse Tb1) of the tracing circuit-b (14b) shown in FIG. 3D2, the timing of the second transmission wave is communicated to the masking circuit 12 to prevent the other tracing circuits (i.e., the tracing circuit-a (14a) etc.) from operating with the same timing (masking condition M3). As a result, a block B4 that is output from the amplitude judgment circuit 11 is subjected, as it is, to timing tracing by the tracing circuit-b (14b). As described above, each of the tracing circuit-a (14a) and the tracing circuit-b (14b) communicates the timing of the transmission wave being traced by itself to the masking circuit 12 to prevent the other tracing circuits (i.e., the tracing circuit-c (14c) etc.) from operating with the same timing. The masking circuit 12 performs masking during a timing that is the reception timing 72 or the like that is output from the tracing circuit-a (14a) or the like plus/minus a 0.5 chip timing, and can thereby prevent the already detected transmission wave from being detected again.

As described above, in the embodiment 2, a plurality of tracing circuits for tracing a plurality of reception waves, respectively, are provided and each of the tracing circuits communicates the timing of the reception wave being traced by itself to the masking circuit to prevent the other tracing circuits from operating with the same timing. The masking circuit invalidates timing detected by the amplitude judgment circuit if it precedes or succeeds already detected timing by, for example, a 0.5 chip timing or less. This makes it possible to prevent an already detected transmission wave from being detected again.

Embodiment 3

Figure 4:
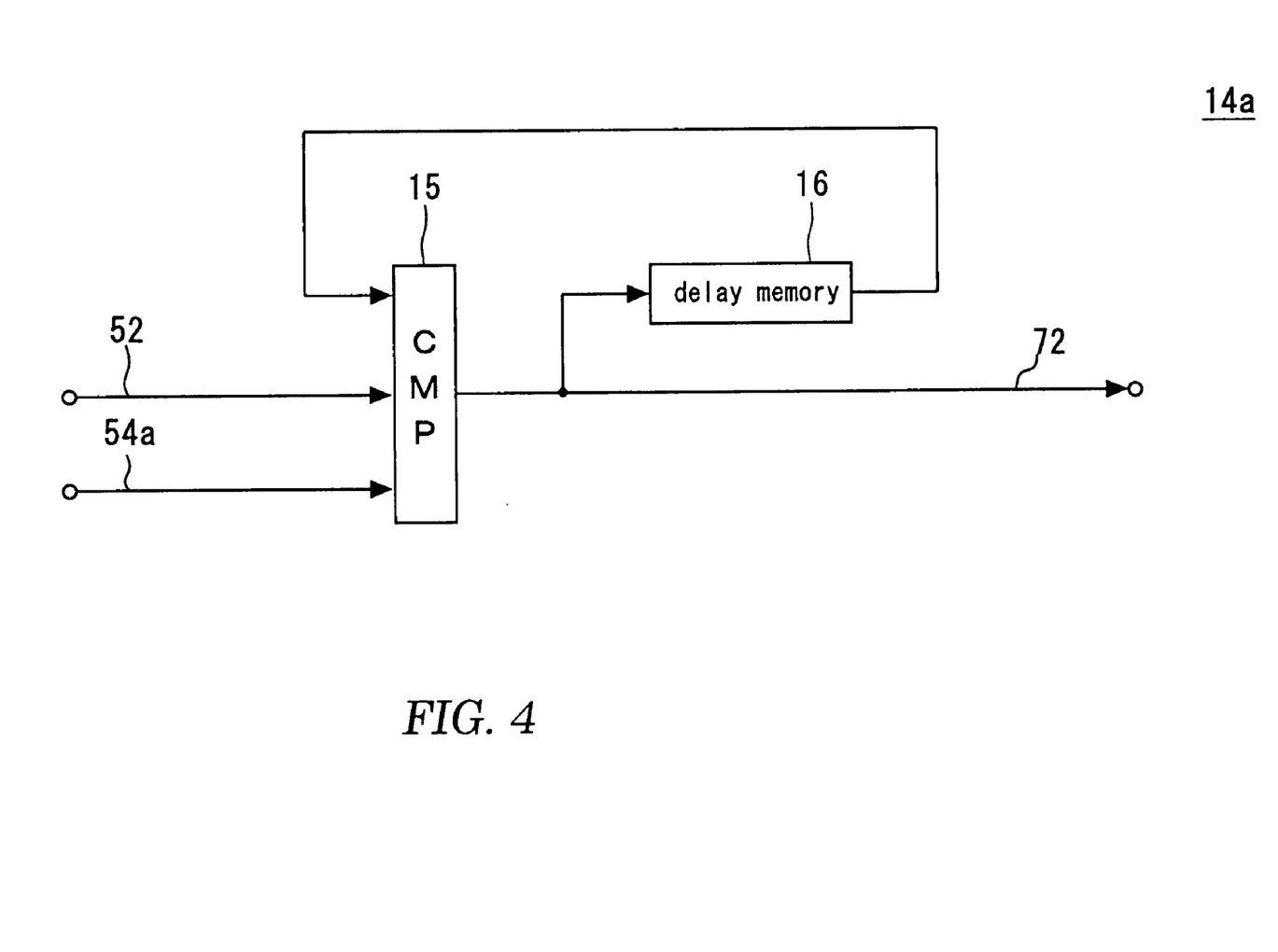
FIG. 4 shows a tracing circuit according to a embodiment 3 of the invention, which is an example of the tracing circuit-a (14a) shown in FIG. 2.

FIG. 4 shows a tracing circuit according to a embodiment 3 of the invention, which is an example of the tracing circuit-a (14a) shown in FIG. 2. The components in FIG. 4 that are given the same reference symbols as the corresponding components in FIG. 1 or 2 have the same functions as the latter and hence will not be described. Although only the tracing circuit-a (14a) will be described below, the other tracing circuits (i.e., the tracing circuit-b (14b) etc.) operate in the same manner as the tracing circuit-a (14a). In FIG. 4, reference numeral 15 denotes a comparison circuit CMP (comparison section) for outputting first reception timing a (72) to the Δf corrector 9a in response to initial synchronization timing a (54a) that is output from the timing judgment circuit 13 and, at the same time, outputting the same reception timing a (52) to a delay memory 16 (described later). The delay memory 16 (delay storage section) stores the reception timing a (72) that is output from the comparison circuit 15 and delays it by one symbol timing, that is, the length of the reception timing stored in the delay memory 16 is a one-symbol timing length. When the tracing circuit-a (14a) outputs second reception timing a (72), it does not receive initial synchronization timing a (54a) from the timing judgment circuit 13. Therefore, the tracing circuit-a (14a) compares amplitudes in a block of an amplitude data signal 52 that is output from the amplitude judgment circuit 11 only in a timing that is the timing stored in the delay memory 16 plus/minus a 0.5 chip timing, selects timing that has the maximum amplitude value in the block, and outputs it as reception timing a (72). At the same time, the tracing circuit-a (14a) records, in the delay memory 16, the selected timing so as to replace the timing that precedes it by one symbol timing Ta. Subsequently, the reception timing is traced by repeating the above operation until the transmission wave being traced ceases.

Figure 5:
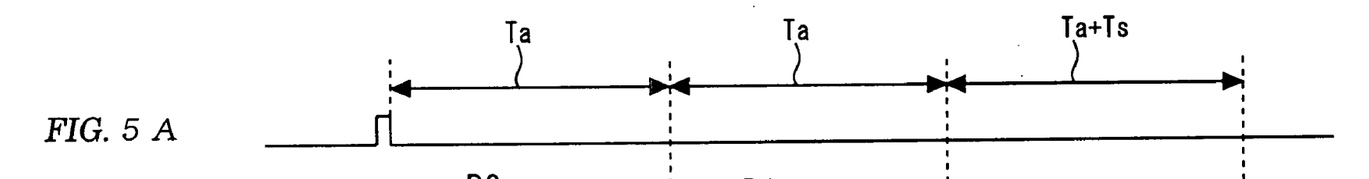

FIGS. 5A–5E are timing charts of the tracing circuit according to the embodiment 3. FIG. 5A shows initial synchronization timing a (54a) that is an output of the timing judgment circuit 13. FIG. 5B shows amplitude data 52 that is an output of the amplitude judgment circuit 11. FIG. 5C shows reception timing a (72) that is an output of the tracing circuit-a (14a). FIG. 5D shows an output of the delay memory 16. FIG. 5E shows window timings during which to perform voltage comparison in the comparison circuit 15.

When an amplitude data 52 (block B0) of a first transmission wave is output from the amplitude judgment circuit 11 as shown in FIG. 5B, as shown in FIG. 5A initial synchronization timing a (54a) is output from the timing judgment circuit 13. As shown in FIG. 5C, the comparison circuit 15 compares the amplitudes in the block B0 of the amplitude data 52, selects timing that has the maximum amplitude value, and outputs a pulse Ta0 as reception timing a (72). The selected timing is recorded in the delay memory 16. As shown in FIG. 5E, the comparison circuit 15 compares the amplitudes in a block B1 of the amplitude data 52 in a window timing CT1 based on a pulse D1 corresponding to the selected timing that is stored in the delay memory 16. Then, the tracing circuit-a (14a) outputs a pulse Ta1 as reception timing a (72).

As described above, in the embodiment 3, the tracing circuit is composed of the comparison circuit 15 and the delay memory 16 for causing a delay of a one-symbol timing Ta. When the tracing circuit outputs second reception timing a (72), the comparison circuit 15 compares the amplitudes in a block of an amplitude data signal 52 that is output from the amplitude judgment circuit 11 only in a timing that is the first reception timing a (72) recorded in the delay memory 16 plus/minus a 0.5 chip timing. Since recording comparison result timing in the delay memory 16 allows this operation to be repeated until the transmission wave being traced ceases, the tracing of the reception timing can be performed.

As described above, the invention can provide a spread spectrum demodulator capable of correctly demodulating, simultaneously, a plurality of reception waves that were spread by using the same spreading signal and transmitted from a plurality of transmitters, by establishing initial synchronization for each of the reception waves and then tracing reception timing of each reception wave individually.

In the spread spectrum demodulator, the timing detector may comprise: an amplitude judgment section for receiving the amplitude components of the plurality of received spread spectrum signals and detecting timing by threshold judgment; a masking section for masking timing detected by the amplitude judgment section when the timing is within a predetermined range of already detected timing, and for outputting only so far undetected timing; a timing judgment section for outputting, as initial synchronization timing, the so far undetected timing inputted from the masking section; a plurality of tracing sections for storing the initial synchronization timing inputted from the timing judgment section and tracing the timing until a spread spectrum signal corresponding to the initial synchronization timing ceases; and a masking condition section for outputting pieces of timing being traced by the respective tracing sections to the masking section.

In the spread spectrum demodulator, each of the tracing sections may comprise: a comparison section for outputting, as first reception timing, the initial synchronization timing inputted from the timing judgment section, comparing amplitudes inputted from the amplitude judgment section by a timing that is within a predetermined timing of a delayed timing from the first reception timing, and outputting, as reception timing, timing having a maximum amplitude; and a delay storage section for storing the reception timing outputted from the comparison section and outputting it to the comparison section after delaying it by a predetermined time.

In the spread spectrum demodulator, the length of the reception timing stored in the delay storage section may be a one-symbol timing length.

In the spread spectrum demodulator, the predetermined range of already detected timing masked by the masking section may be within a 0.5 chip timing before and after the already detected timing.

In the spread spectrum demodulator, the masking condition section may be an logical OR circuit.

The present invention has been described in detail with respect to various embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

The entire disclosure of Japanese Patent Application No. 2000-33788 filed on Feb. 10, 2000 including specification, claims, drawings and summary are incorporated herein by reference in its entirety.

What is claimed is:

1. A spread spectrum demodulator for demodulating a plurality of received spread spectrum signals, comprising:
   a timing detector for receiving amplitude components of the plurality of received spread spectrum signals, the amplitude components being produced by de-spreading and then polar-coordinates-converting the spread spectrum signals, establishing initial synchronization individually for the spread spectrum signals by detecting maximum values of the amplitude components, and outputting individually traced pieces of reception timing of the spread spectrum signals; and
   a plurality of correctors for latching, with the pieces of reception timing that are outputted from said timing detector, a plurality of frequency components of the respective spread spectrum signals, the frequency components being produced by de-spreading and then polar-coordinates-converting the spread spectrum signals, and correcting for an/offset, and outputting resulting signals.

2. The spread spectrum demodulator according to claim 1, wherein said timing detector comprises:
   an amplitude judgment section for receiving the amplitude components of the plurality of received spread spectrum signals and detecting timing by threshold judgment;
   a masking section for masking timing detected by said amplitude judgment section when the timing is within a predetermined range of already detected timing, and for outputting only so far undetected timing;
   a timing judgment section for outputting, as initial synchronization timing, the so far undetected timing inputted from said masking section;
   a plurality of tracing sections for storing the initial synchronization timing inputted from said timing judgment section and tracing the timing until a spread spectrum signal corresponding to the initial synchronization timing ceases; and a masking condition section for outputting pieces of timing being traced by said respective tracing sections to said masking section.

3. The spread spectrum demodulator according to claim 2, wherein each of said tracing sections comprises:

a comparison section for outputting, as first reception timing, the initial synchronization timing inputted from said timing judgment section, comparing amplitudes inputted from said amplitude judgment section by a timing that is within a predetermined timing of a delayed timing from the first reception timing, and outputting, as reception timing, timing having a maximum amplitude; and a delay storage section for storing the reception timing outputted from said comparison section and outputting it to said comparison section after delaying it by a predetermined time.

4. The spread spectrum demodulator according to claim 3, wherein the length of the reception timing stored in said delay storage section is a one-symbol timing length.

5. The spread spectrum demodulator according to claim 4, wherein the predetermined range of already detected timing masked by said masking section is within a 0.5 chip timing before and after the already detected timing.

6. The spread spectrum demodulator according to claim 5, wherein said masking condition section is an logical OR circuit.

7. The spread spectrum demodulator according to claim 4, wherein said masking condition section is an logical OR circuit.

8. The spread spectrum demodulator according to claim 3, wherein the predetermined range of already detected timing masked by said masking section is within a 0.5 chip timing before and after the already detected timing.

9. The spread spectrum demodulator according to claim 8, wherein said masking condition section is an logical OR circuit.

10. The spread spectrum demodulator according to claim 3, wherein said masking condition section is an logical OR circuit.

11. The spread spectrum demodulator according to claim 2, wherein the predetermined range of already detected timing masked by said masking section is within a 0.5 chip timing before and after the already detected timing.

12. The spread spectrum demodulator according to claim 11, wherein said masking condition section is an logical OR circuit.

13. The spread spectrum demodulator according to claim 2, wherein said masking condition section is an logical OR circuit.

* * * * *